United States Patent [19]

Perreault

[11] 3,902,009

[45] Aug. 26, 1975

[54] MULTI APERTURE SCANNING AND PRINTING FOR FACSIMILE LINE SKIPPING

[75] Inventor: Donald Arthur Perreault, Dallas, Tex.

[73] Assignee: Xerox Corporation, Stamford, Conn.

[22] Filed: June 17, 1974

[21] Appl. No.: 480,198

[52] U.S. Cl. .................... 178/6; 176/DIG. 3

[51] Int. Cl. .................... H04n 1/24

[58] Field of Search .................... 178/DIG. 3, 6, 8

[56] References Cited

UNITED STATES PATENTS

| | | | |
|---|---|---|---|
| 3,643,016 | 2/1972 | Damlo | 178/DIG. 3 |
| 3,706,842 | 12/1972 | Robertson | 178/6 |
| 3,801,737 | 4/1974 | Komura et al. | 178/DIG. 3 |
| 3,804,975 | 4/1974 | Abe | 178/DIG. 3 |

*Primary Examiner*—Howard W. Britton

*Assistant Examiner*—Michael A. Masinick

[57] ABSTRACT

A redundant line skipping technique for adaptively improving the document transmission time-resolution characteristics of limited bandwidth facsimile systems wherein adjacent lines of the scanning pattern for the facsimile copy are simultaneously or individually printed on a single pass or on separate passes depending on whether the corresponding lines of the scanning pattern for the subject copy contain redundant or nonredundant information.

26 Claims, 9 Drawing Figures

MULTI APERTURE SCANNING AND PRINTING FOR FACSIMILE LINE SKIPPING

BACKGROUND OF THE INVENTION

This invention relates to limited bandwidth facsimile systems and, more particularly, to methods and means for adaptively improving the document transmission time-resolution characteristics of such systems.

The mounting demand for rapid and accurate communication of graphic information (e.g., written and printed material, drawings, sketches, etc.) has led to the development of facsimile systems which are capable of providing a remote location with a replica or "facsimile" of a subject copy in a matter of just a few minutes. To that end, the typical facsimile system comprises a transmitting terminal for converting the information content of the subject copy into a video signal, a transmission channel for carrying the video signal (or, more commonly, a carrier modulated in accordance with it) to the remote location, and a remotely located receiving terminal for printing the facsimile copy in response to the video signal.

Document transmission time and resolution are both important performance parameters for such systems. The first is a measure of the time required to generate the facsimile copy and the other is a measure of the quality of that copy. Ideally, the document transmission time is minimized and the resolution is maximized. Those are, however, inconsistant goals because most, if not all, facsimile communications are carried out over limited bandwidth transmission channels. Indeed, the public switched telephone network has become a favored transmission medium for facsimile messages because subscribers may rely on it for a communications link to or from almost any point. But, those links are bandwidth limited. For example, a conventional voice grade telephone channel has an available bandwidth of only 3 KHz. or so.

It is generally acknowledged that the maximum permissible data transmission rate for a limited bandwidth system is defined by what is known as Nyquist's rule. A generalized expression of that rule as applied to a low pass transmission channel is:

$$\frac{c}{f_1} = 2 \log_2 b \text{ bits per second/cycle of band width}$$

where:

$c$ = bits;

$f_1$ = the upper cut-off frequency of the channel; and $b$ = the number of discrete signalling levels for the data.

The equivalent expression for a double sideband carrier system is:

$$\frac{c}{f_2} = \log_2 b \text{ bits per second/cycle of band width}$$

Others have previously recognized the possibilities of so-called "white line skipping" as a means for achieving reduced document transmission time and/or increased resolution, without violating Nyquist's rule. For instance, reference may be had to a commonly assigned U.S. Pat. No. 3,448,207 on "Method and Apparatus for Accomplishing Line Skipping in a Facsimile System". Heretofore, however, the increased data transmission rates offered by line skipping have been realizable only in connection with the processing of scan line length long background areas or, in other words, white lines.

SUMMARY OF THE INVENTION

In contrast, an important object of this invention is to provide methods and means for scanning and printing redundant lines of a subject copy and a facsimile copy, respectively, on a single pass, regardless of whether those lines have interspersed background and image areas or not. Stated another way, a primary goal is to provide a line skipping technique which applies to redundant lines generally, not just to white lines.

Indeed, a more detailed object of the present invention is to provide a redundant line skipping technique of the foregoing type which may be augmented by white line skipping and other techniques used in limited bandwidth facsimile systems to obtain improved transmission timeresolution characteristics.

Another of the detailed objects of this invention is to provide relatively inexpensive and reliable methods and means for implementing a redundant line skipping technique having the aforementioned characteristics.

To achieve these and other aims of the invention, a predetermined plurality of the lines of the scanning pattern for the subject copy are simultaneously scanned on each scanning pass and the corresponding lines of the scanning pattern for the facsimile copy are simultaneously or individually printed depending on whether they are redundant or non-redundant. The procedure is repeated for successive sets of lines and provision is made for controlling the rates at which the scanning and printing processes are advanced in the scan pitch direction so that sets of redundant lines are scanned and printed on a single pass, but nonredundant lines are scanned and printed on separate passes. Specifically, the printing is carried out in response to a video signal serially representing the information content of a predetermined one of the lines of each of those sets, under the control of a control signal having a signalling state indicating for each such set whether the lines thereof are redundant or not. Thus, redundant lines are skipped, but none of the significant information is sacrificed.

BRIEF DESCRIPTION OF THE DRAWINGS

Still other objects and advantages of the invention will become apparent when the following detailed description is read in conjunction with the attached drawings, in which.

DETAILED DESCRIPTION OF THE ILLUSTRATED EMBODIMENTS

While the invention is described hereinafter in some detail with specific reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
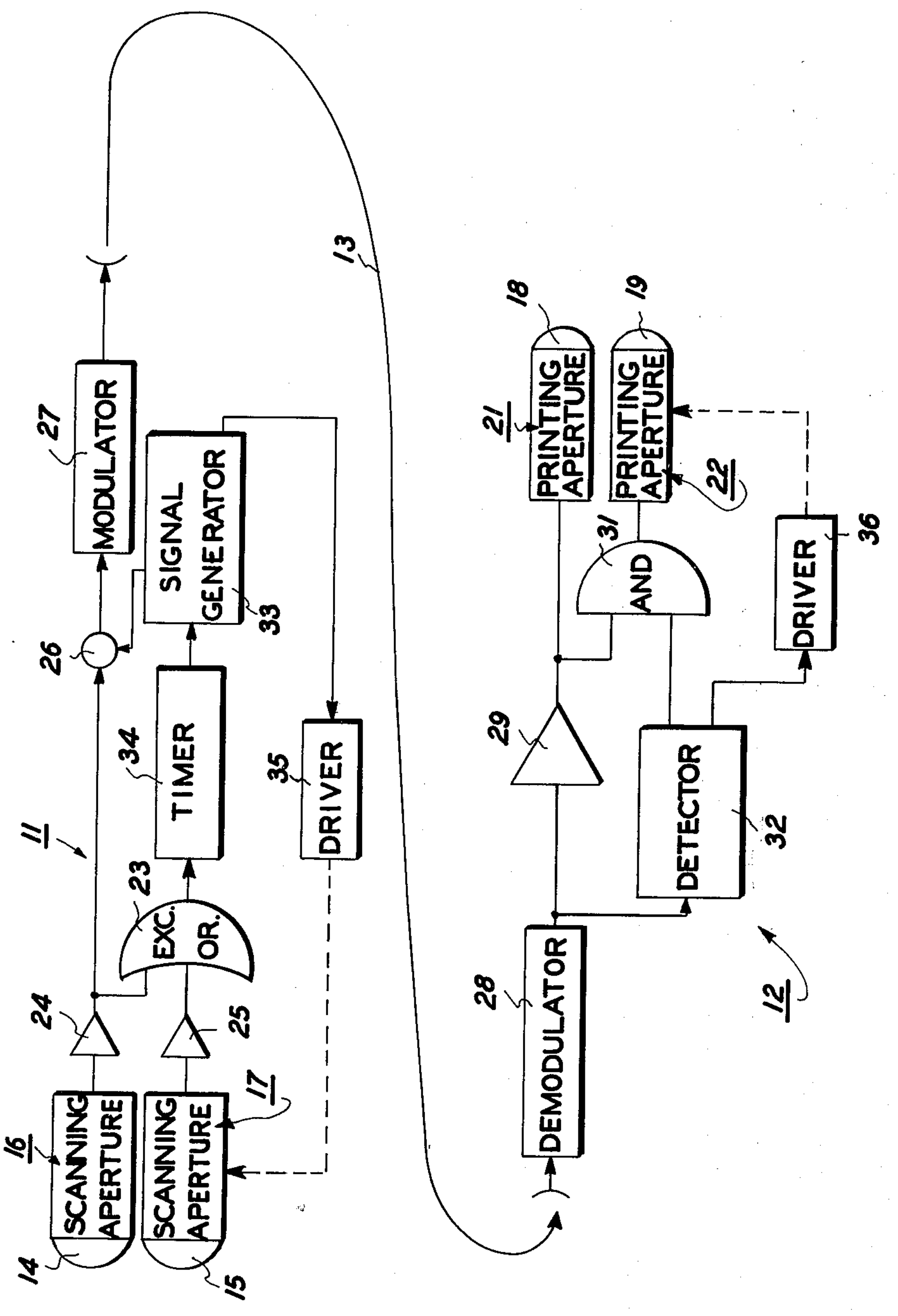
FIG. 1 is a simplified block diagram of a facsimile system constructed in accordance with one embodiment of the present invention.

Turning now to the drawings, and at this point especially to FIG. 1, it will be seen that there is a limited bandwidth facsimile system comprising a transmitting terminal 11 and a receiving terminal 12 interconnected by a communications link 13. The bandwidth of the system is normally constrained by the communications link 13 because that link is customarily a limited bandwidth channel which is provided on a demand basis by, say, the public switched telephone network.

In keeping with standard practices, the transmitting terminal 11 and the receiving terminal 12 are operated in phase synchronism to scan a subject copy (not shown) and print a facsimile copy (also not shown), respectively, in accordance with predetermined scanning patterns. Typically, substantially identical, "normal" X-Y scanning patterns are employed, whereby the subject copy and the facsimile copy are each effectively divided into a series of uniformly spaced scan lines which run from left-to-right and follow from top-to-bottom. As will be appreciated, that pattern creates a substantially horizontal line scanning direction and causes centers of adjacent scan lines to be vertically separated by a predetermined scan pitch.

In accordance with the present invention, the transmitting terminal 11 includes a plurality of photoelectric transducers 14 and 15 which have their centers aligned transversely of the line scanning direction and offset from each other by an integer multiple of the scan pitch to thereby define separate scanning apertures 16 and 17, respectively. Similarly, the receiving terminal 12 has a plurality of print heads 18 and 19 on centers which are aligned and offset in the same manner as the transducers 14 and 15, thereby defining separate printing apertures 21 and 22, respectively. The transducers 14 and 15 simultaneously convert the information appearing along different scan lines of the scanning pattern for the subject copy into separate video signals, but only one of those signals is transmitted to the receiving terminal 12. Hence, one of the printing apertures 21 and 22 is activated at all times, but provision is made for selectively activating and de-activating the other so that there is a block format for simultaneously printing redundant lines on a single scanning pass and a line-by-line format for individually printing non-redundant lines on separate passes.

More particularly, in this embodiment, there are the same number of scanning apertures 16, 17 and printing apertures 21, 22. Furthermore, the offset spacing for both sets of apertures is selected to equal the scan pitch. Thus, the scanning apertures and the printing apertures are operated in positionally corresponding scan-print pairs 16, 21 and 17, 22 to scan and print adjacent lines of the scanning patterns for the subject copy and the facsimile copy on a single pass if the lines are redundant and on separate passes if the lines are non-redundant.

To accomplish that, the video signals generated by the transducers 16 and 17 are applied to different inputs of an exclusive OR gate 23 by matched amplifiers 24 and 25, respectively. Additionally, the amplified version of the video signal from the trailing transducer 16 is routed to a summing node 26 where it is combined with a control signal having a signalling state indicating whether the transducers 16 and 17 are scanning redundant or nonredundant lines. The composite signal (i.e., video signal and control signal) is then applied to a modulator 27 which, in turn, supplies a carrier signal modulated in accordance with the composite signal for transmission to the receiving terminal 12 via the communications link 13.

At the receiving terminal 12, there is a demodulator 28 for recovering the composite signal, a suitable amplifier 29 for applying the video component of the composite signal to the trailing print head 18 and to one input of an AND gate 31, and a detector 37 for selectively enabling and disabling the AND gate 31 depending on the signalling state of the control signal. As shown, the output of the AND gate 31 is coupled to the leading print head 19 so that the leading printing aperture 22 is selectively enabled and disabled under the control of the detector 32 in response to the signalling state of the control signal.

Returning for a moment to the transmitting terminal 11, it will be observed that the control signal is provided by a signal generator 33 under the control of the exclusive OR gate 23 and a timer 34. To accomodate this embodiment, the signal generator 33 is internally reset in preparation for each scanning pass so that the signalling state of the control signal (1) initially indicates that redundant lines are being scanned, but (2) is subject to being changed on an intra-scan basis to indicate that non-redundant lines are being scanned if that happens to be the case. Specifically, the exclusive OR gate 23 is enabled only if the video signals from the transducers 16 and 17 fail to track each other such that one is at a high ("1") logic level while the other is at a low ("0") logic level. If that condition persists for a predetermined period of time, the timer 34 confirms that non-redundant lines are being scanned by timing out to trigger the signal generator 33, thereby changing the signalling state of the control signal. Minor perturbations in the video signals from the transducers 16 and 17, which might create a false impression that non-redundant lines are being scanned, are ignored because of the timeout period of the timer 34, without sacrificing the ability to detect a non-redundant condition when it exists.

There are a number of options for combining the control signal with the video signal so that each of them may be faithfully recovered at the receiving terminal 13. That is, the control signal may be in-band or out-of-band with respect to the video signal. For example, if the video signal occupies a predetermined range of positive voltages, the control signal can have a more positive voltage or a negative voltage. Or, if the coding is employed, codes not utilized for the video signal may be reserved for the control signal.

In keeping with this invention, provision is made for advancing the scanning apertures 16, 17 and the printing apertures 21, 22 from one set of scan lines to the next at a rate which is varied so that the trailing pair 16, 21 is always aligned at the outset of each scanning pass with the uppermost scan line remaining to be processed. In short, redundant lines are skipped (i.e., processed once on a single pass), without skipping non-redundant lines. To that end, control signals from the signal generator 33 and the detector 32 govern the rate at which drivers 35 and 36 advance the transducers 14, 15 and print heads 18, 19, respectively, transversely of the line scanning direction. Suitably, the drivers 35 and 36 are stepping motors or the like which are activated after each scanning pass by those signals so that the transducers 14, 15 and the print heads 18, 19 are advanced a plural (i.e., selected to equal the number of print heads) multiple of the scan pitch if the preceeding set of lines was redundant or a unit multiple of the scan pitch if those lines were not redundant.

Figure 2:
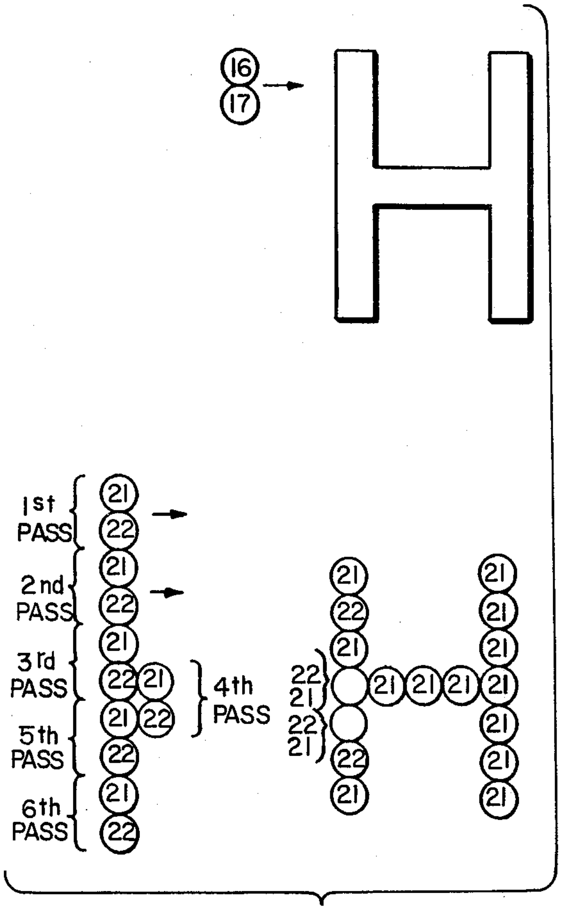
FIG. 2 diagrammatically illustrates typical scanning and printing sequences of the system shown in FIG. 1.

Referring to FIG. 2, the foregoing can be brought into sharp focus by taking the scanning and printing of the letter "H" as an example. The convention that has been adopted for this example refers to the scanning apertures 16, 17 and the printing apertures 21, 22 to indicate how the component parts of that letter are processed. As will be noted, redundant lines are encountered on the first and second passes and, therefore, both of the printing apertures 21, 22 are activated during those passes, to take advantage of the redundant line skipping ability of the system. Nothing but background is covered on the first pass. However, the second pass covers interspersed background and image areas. During the third and fourth passes, the leading printing aperture 22 is disabled so that the nonredundant lines encountered on those passes are printed on a line-by-line basis by the trailing printing aperture 21. On the fifth pass, another set of redundant lines is encountered, with the result that the system again relies on its block printing format to simultaneously print those lines on a single pass. Finally, the sixth pass involves another set of non-redundant lines and, consequently, the system reverts to its line-by-line printing format.

The foregoing process is, of course, repeated for successive sets of scan lines as often as is necessary to generate a complete facsimile of the subject copy. Hence, it will be understood that the improvement in, say, the document transmission time is "adaptive" in the sense that the time saved depends on the distribution and character of the information content of the subject copy.

Figure 3:
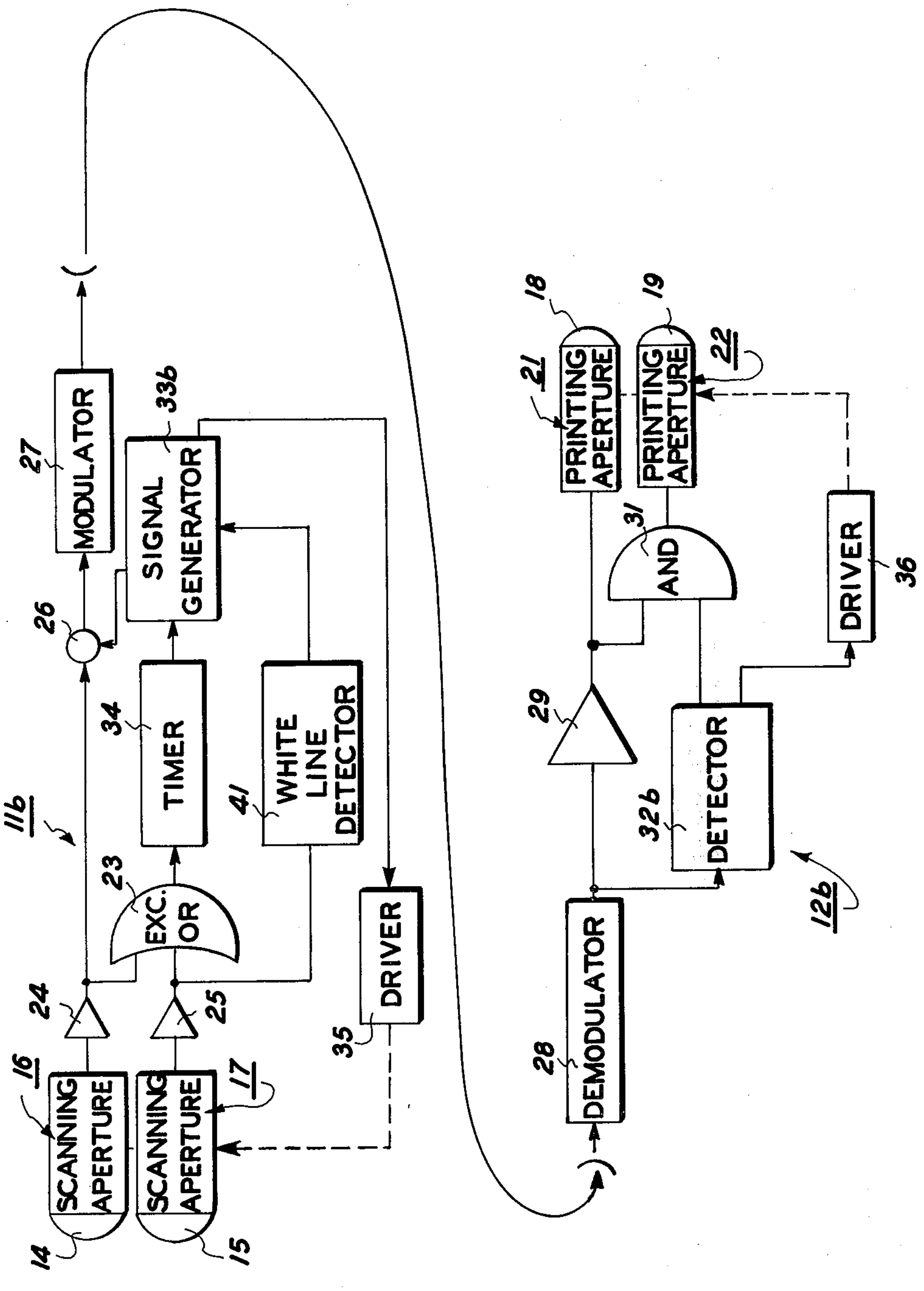
FIG. 3 is a simplified block diagram illustrating the system of FIG. 1 as modified to include white line skipping.

Referring now to FIG. 3, in accordance with one of the more detailed aspects of this invention, the advantages of redundant line skipping may be combined with the advantages of white line skipping to further increase the potential for reducing the document transmission time. To accomplish that, while otherwise retaining the characteristics of the embodiment shown in FIG. 1, there is a white line detector 41 coupled between the amplifier 25 and the signal generator **33*b* of the transmitting terminal 11*b*. The purpose of the detector 41 is to provide a white line indication for the signal generator 33*b*, whenever the video signal from the leading transducer 15 remains at a predetermined level characteristic of background information throughout a complete scanning pass. The signal generator 33*b* responds to that indication by signalling the driver 35 to advance the transducers 16 and 17 an additional scan pitch length step so that they skip the white line and by signalling the receiving terminal 12*b* to advise it of the white line. The signal provided for the receiving terminal 12*b* is sensed by the detector 32*b* which, in turn, signals the driver 36 to advance the print heads 18 and 19 an additional scan pitch length step so that they also skip the white line. As will be appreciated, the white line signalling for the receiving terminal 12*b*** may be combined with the redundant line signalling, either by using separate signalling states of one control signal or by using different control signals.

Figure 4:
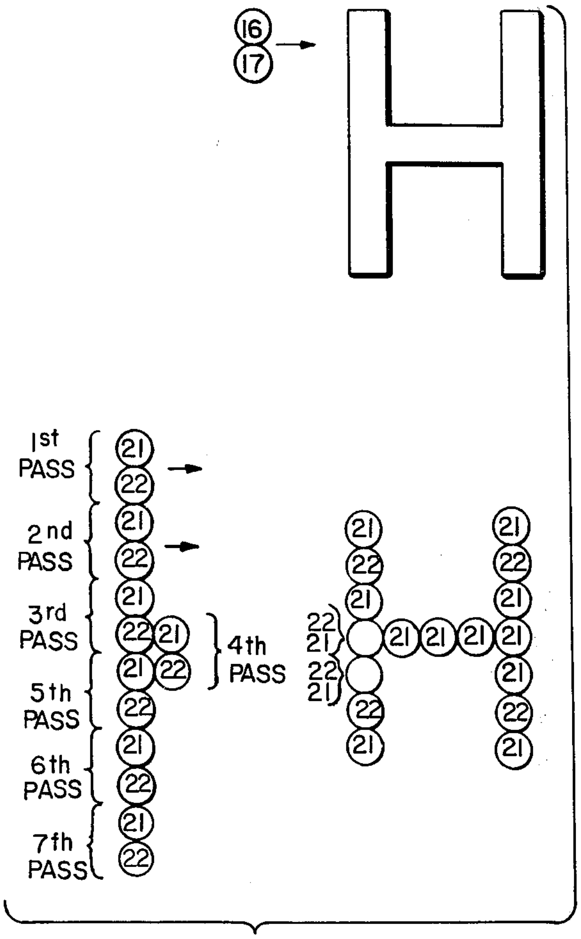
FIG. 4 diagrammatically illustrates typical scanning and printing sequences of the modified system shown in FIG. 3.

FIG. 4 relies on the previously mentioned convention to highlight the advantages of using white line skipping in combination with redundant line skipping. In particular, as illustrated, a pair of non-redundant lines are encountered on the sixth scanning pass, but those lines are still effectively processed by that one pass because the leading or lowermost line happens to be a white line.

Re-printing of the initial portions of some of the scan lines of the scanning pattern for the subject copy is likely to occur in the embodiments discussed up to this point because the signal generators 33 (FIG. 1) and **33*b* (FIG. 3**) are internally reset in preparation for each scanning pass to conditionally indicate that redundant lines are being scanned. As a general rule, that does not lead to excessive degradation of the quality of the facsimile copy. Nevertheless, it may be avoided if so desired.

Figure 5:
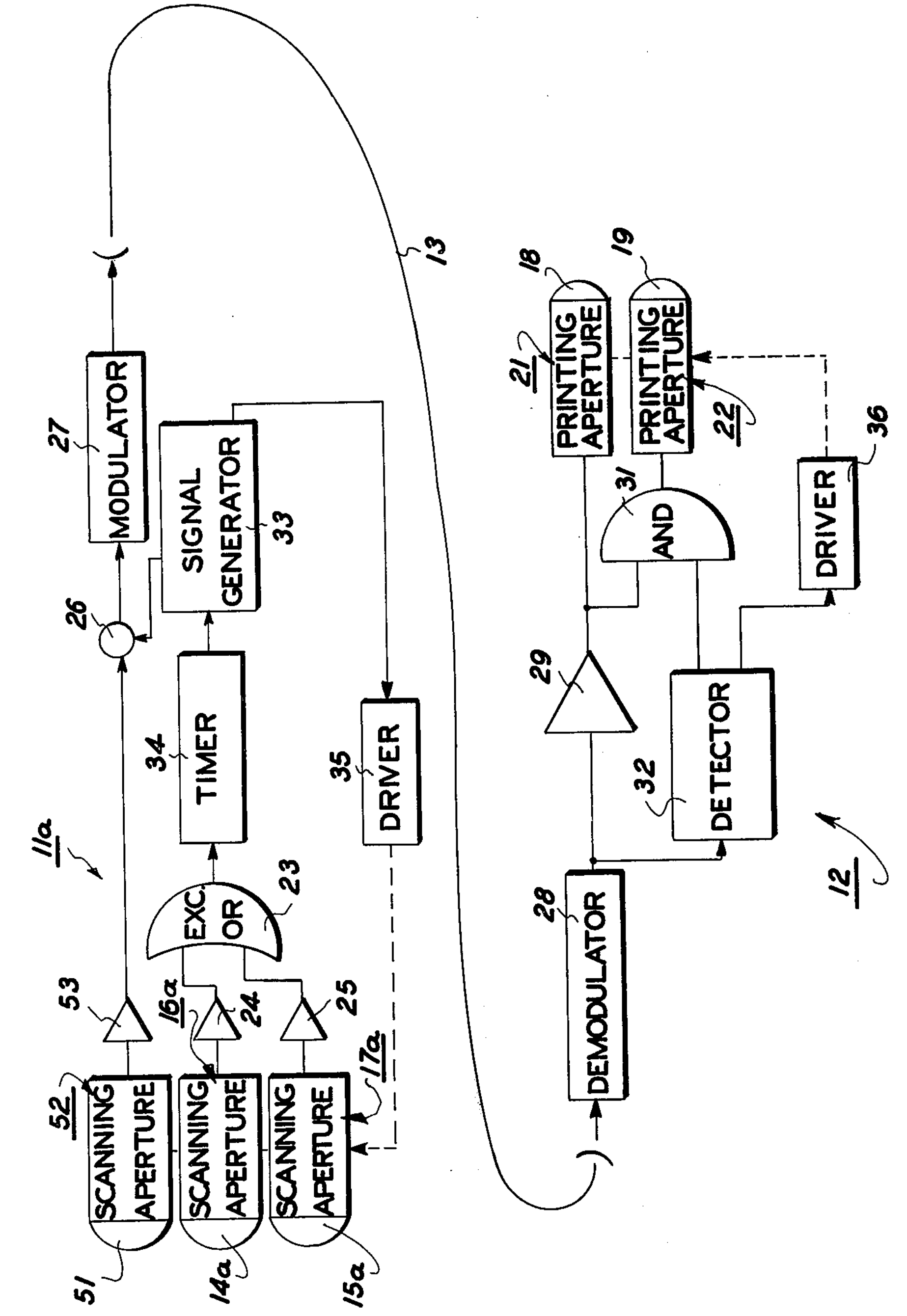
FIG. 5 is a simplified block diagram of a facsimile system constructed in accordance with another embodiment of this invention.

To that end, as shown in FIG. 5, an additional transducer 51 is included in the transmitting terminal **11*a* to define another scanning aperture 52 so that the other transducers 14*a* and 15*a* may be operated in advance of their corresponding print heads 18 and 19, respectively. The alignment of and spacing between the transducers 14*a*, 15*a* and 51 is the same as in the other embodiments and the video signals generated by the transducers 14*a* and 15*a* are used, as previously described, to set the signalling state of the control signal supplied by the signal generator 33. The major difference is that the video signal for the receiving terminal 12 is supplied by the transducer 51 via an amplifier 53. That transducer is the trailing one and, therefore, the other transducers 14*a* and 15*a* are prescanning the next set of scan lines to determine whether they are redundant or not. Accordingly, the signalling state of the control signal is set under the control of the video signals from transducers 14*a* and 15*a* on an inter-scan, rather than intra-scan, basis. Specifically, the prescanning action of the transducers 14*a* and 15*a* provides all of the information that is necessary for the signal generator 33** to appropriately and unconditionally set the signalling state of the control signal upon the conclusion of one scanning pass in preparation for the next one during, say, an intervening flyback interval.

To maintain the scanning apertures 16, 17 and 52 in phase synchronism with the printing apertures 21 and 22, the transducers **14*a*, 15*a* and 51** and the print heads 18 and 19 are advanced under the control of the video signals from the transducers 14*a* and 15*a* on a pre-scan and post-scan basis, respectively. That is, the transducers 14*a*, 15*a* and 51 are advanced by the driver 35 in response to a signal from the signal generator 33 at a line skipping or line-by-line rate after each set of lines is pre-scanned by the transducers 14*a* and 15*a*, but before any one of those lines is finally scanned by the transducer 51. The print heads 18 and 19, on the other hand, are advanced at a line skipping or line-by-line rate by the driver 36 in response to a signal from the detector 32 after the transducer 51 has completed its scanning pass. As will be recalled, the distance moved per scanning pass is equal to the product of the number of print heads 21 and 22 multiplied by the scan pitch, if the line skipping rate is employed, or to the scan pitch, if the line-by-line rate is employed.

Figures 6, 8:
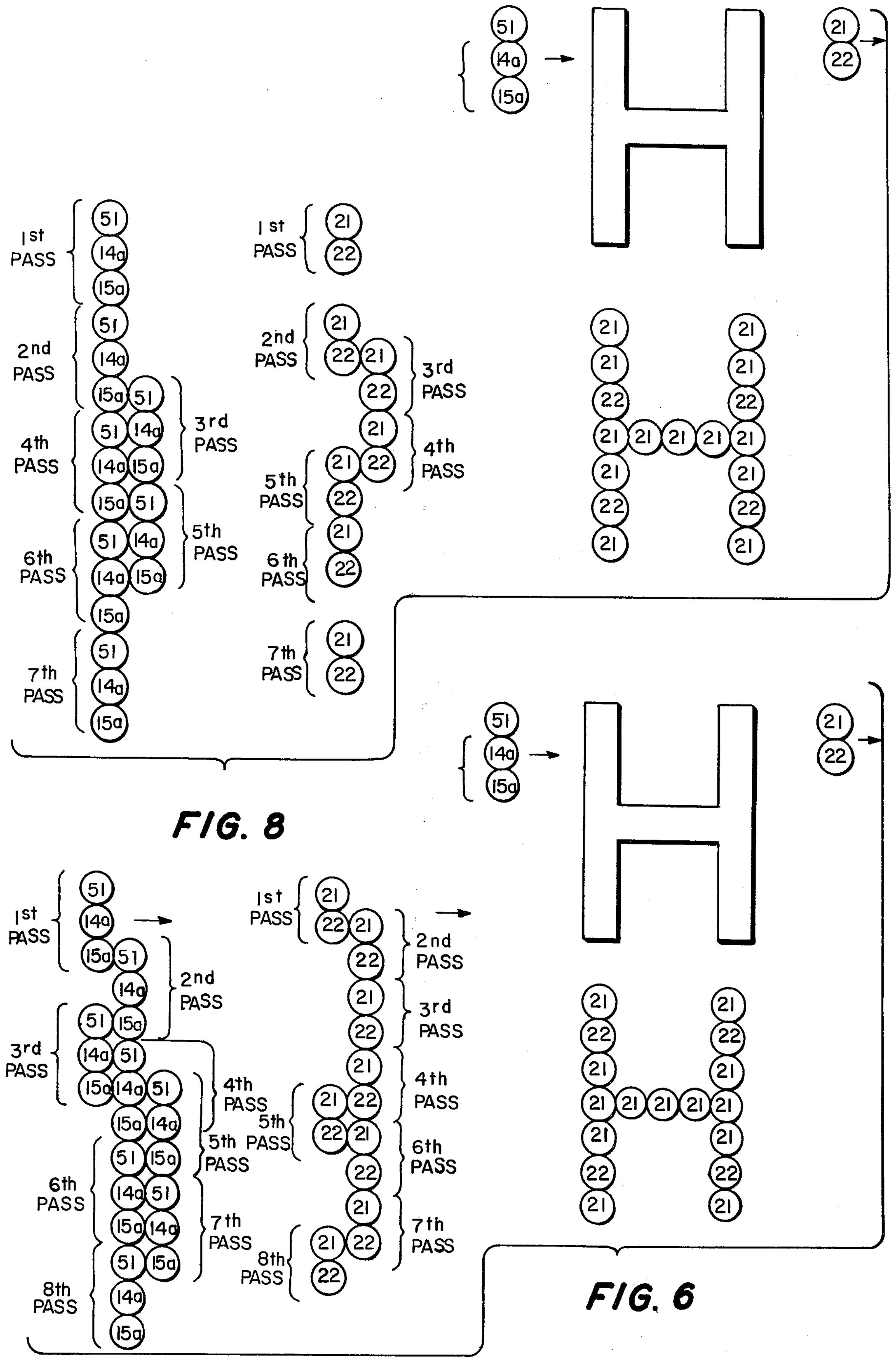
FIG. 6 diagrammatically illustrates typical scanning and printing sequences of the system shown in FIG. 5.
FIG. 8 diagrammatically illustrates typical scanning and printing sequences of the modified system shown in FIG. 7.

FIG. 6 uses the previously described convention to illustrate typical scanning and printing sequences of the embodiment shown in FIG. 5. In this example, the block printing format is used on the second, third, sixth and eighth passes to simultaneously print redundant lines, and the line-by-line format is used on the fourth, fifth and seventh passes to individually print non-redundant lines. It will be seen that the first pass is also carried out with a line-by-line printing format, even though the print heads 21 and 22 are aligned with redundant lines during that pass. The reason for that is the first pass is initiated without the benefit of the pre-scanning provided for subsequent passes by the transducers 14a and 15a, thereby necessitating the assumption that non-redundant lines will be encountered on the first pass.

Figure 7:
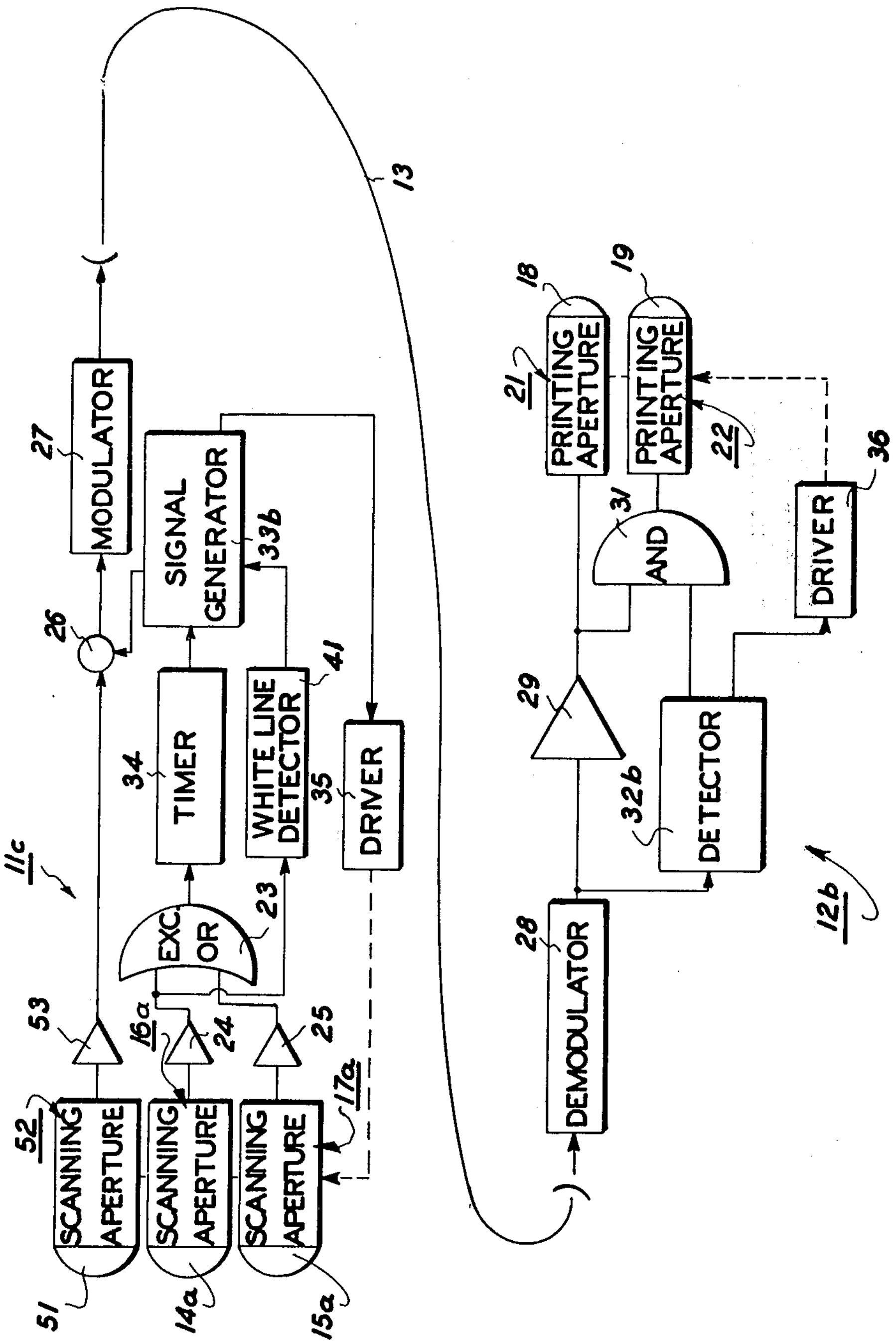
FIG. 7 is a simplified block diagram illustrating the system of FIG. 5 as modified to include white line skipping.

Turning to FIG. 7, the embodiment shown in FIG. 5 can also be modified to include a white line skipping capability. To that end, a white line detector 41 is coupled between the amplifier 24 and the signal generator 33 to operate in much the same manner as was previously described with reference to FIG. 4. Indeed, the only notable change is that the white line detector 41*a* responds to the video signal from the transducer 14*a*. That, of course, is consistent with the fact that white line skipping is employed to basically override the line-by-line printing format of the basic system whenever the next line to be scanned happens to be a white line.

FIG. 8 illustrates the advantages of using white line skipping in combination with the redundant line skipping provided by the embodiment shown in FIG. 5. What is especially noteworthy is that the white line skipping permits the scanning and printing processes to advance an additional scan pitch length step after the first and sixth scanning passes because of the white lines encountered by the transducer 14*a* on those passes.

Figure 9:
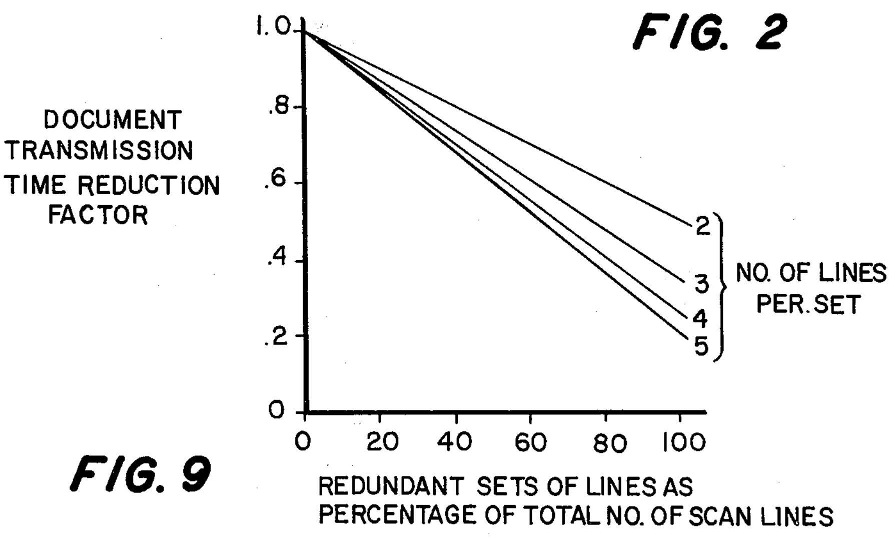
FIG. 9 graphically illustrates the correlations between (a) the reduction in transmission time achieved by using redundant line skipping while maintaining a predetermined resolution, (b) the percentage of the original document or subject copy covered by sets of redundant lines and (c) the number of lines contained by each of those sets.

Referring to FIG. 9, it will be seen that redundant line skipping must be classified as an adaptive technique for improving the document transmission time-resolution characteristics of limited bandwidth facsimile systems. Even if the resolution is predetermined, as is generally the case, the variables that determine the percent reduction in the document transmission time are (1) the number of printing apertures (or, in other words, the number of scan lines per "set" of lines) and (2) the percent of the total scan lines for the subject copy that are included in redundant sets of lines.

CONCLUSION

In view of the foregoing, it will now be understood that the present invention provides a redundant line skipping technique for adaptively improving the document transmission time-resolution characteristics of limited bandwidth facsimile systems. Furthermore, it will be appreciated that this technique may be used alone or in combination with other techniques, such as white line skipping, for improving the efficiency of such systems.

What is claimed is:

1. In a facsimile transmitting terminal for scanning a subject copy in accordance with a scanning pattern having a series of uniformly spaced scan lines separated from one another by a predetermined scan pitch; the combination of a plurality of photoelectric transducers aligned transversely of said scan lines and offset from one another by an integer multiple of said scan pitch for simultaneously converting information appearing on said subject copy along different ones of said scan lines into corresponding video signals;

means for generating a control signal in response to the video signals provided by at least certain ones of said transducers, said control signal having one signalling state whenever said certain transducers scan lines bearing redundant information and another signalling state whenever said certain transducers scan lines bearing non-redundant information; and means for combining said control signal with a predetermined one of said video signals for transmission to a receiving terminal.

2. The facsimile transmitting terminal of claim 1 wherein said said transducers are offset from one another by a distance equal to said scan pitch, whereby said transducers simultaneously convert the information appearing along adjacent scan lines into corresponding video signals; and further including means for advancing said transducers from one set of scan lines to another in response to the video signals provided by said certain transducers, whereby said transducers are advanced for successive scanning passes at a line skipping rate whenever said certain transducers scan lines bearing redundant information and at a line-by-line rate whenever said certain transducers scan lines bearing non-redundant information.

3. The facsimile transmitting terminal of claim 2 wherein said predetermined video signal is provided by a transducer which trails the other of said transducers.

4. The facsimile transmitting terminal of claim 3 further including a white line detector for generating a white line indication whenever the video signal provided by the transducer next to said trailing transducer remains at a level characteristic of background information throughout a scanning pass, means for advancing said transducers an additional increment equal to said scan pitch in response to said indication, and means for combining said indication with said control signal and said predetermined video signal for transmission to said receiving terminal.

5. In a facsimile transmitting terminal for scanning a subject copy in accordance with a scanning pattern having a series of uniformly spaced scan lines separated from one another by a predetermined scan pitch; the combination of a plurality of photoelectric transducers aligned transversely of said scan lines and offset from one another by said scan pitch for simultaneously converting information appearing on said subject copy along adjacent ones of said scan lines into corresponding video signals during each scanning pass of said transducers relative to said subject copy;

means coupled to said transducers for generating a control signal in response to said video signals, said control signal having a signalling state which is changed during said scanning pass if said adjacent scan lines bear non-redundant information; and means for combining said control signal with a predetermined one of said video signals for transmission to a receiving terminal.

6. The facsimile transmitting terminal of claim 5 wherein said control signal is supplied by a signal generator which is internally reset in preparation for each scanning pass; and further including gate means coupled to said transducers for detecting any non-tracking of said video signals, and timer means coupled between said gates means and said signal generator for triggering said signal generator to change the signalling state control signal whenever said video signals fail to track for a predetermined period of time.

7. The facsimile transmitting terminal of claim 5 further including means for advancing said transducers from one set of scan lines to another at a rate which is varied in response to said video signals to provide single pass processing for any set of redundant lines and linebyline processing for any non-redundant lines.

8. The facsimile transmitting terminal of claim 7 wherein said predetermined video signal is provided by a transducer which trails the other of said transducers.

9. THe facsimile transmitting terminal of claim 8 further including white line detector means coupled to the transducer adjacent said trailing transducer for providing a white line indication whenever the video signal provided by said adjacent transducer remains at a level characteristic of background information throughout a scanning pass, means for advancing said transducers an additional increment equal to said scan pitch in response to said indication, and means for combining said indication with said control signal and said predetermined video signal for transmission to said receiving terminal.

10. The facsimile transmitting terminal of claim 9 wherein said control signal is supplied by a signal generator which is internally reset in preparation for each scanning pass; and further including gate means coupled to said transducers for detecting any non-tracking of said video signal, and timer means coupled between said gate means and said signal generator for triggering said signal generator to change the signalling state of said control signal whenever said video signals fail to track for a predetermined period of time.

11. In a facsimile transmitting terminal for scanning a subject copy in accordance with a scanning pattern having a series of uniformly spaced scan lines separated from one another by a predetermined scan pitch; the combination of a plurality of photoelectric transducers aligned transversely of said scan lines and offset from one another by said scan pitch for simultaneously converting information appearing on said subject copy along adjacent ones of said scan lines into corresponding video signals during each scanning pass of said transducers relative to said subject copy;

means coupled to all except an extreme one of said transducers for generating a control signal in response to the video signals provided by the other of said transducers, said control signal being set after each scanning pass at one signalling state if said other transducers encounter redundant lines on that pass and at another signalling state if said other transducers encounter non-redundant lines; and means for combining said control signal with the video signal provided by said one transducer for transmission to a receiving terminal.

12. The facsimile transmitting terminal of claim 11 wherein the signalling state of said control signal is set by a signal generator under the control of a gate means and a timer means; said gate means being coupled to the other of said transducers for detecting any nontracking of the video signals provided thereby, and said timer means being coupled between said gate means and said signal generator for triggering said generator so that said control signal is set to said other signalling state following any scanning pass during which the video signals from said other transducers fail to track for a predetermined period of time.

13. The facsimile transmitting terminal of claim 11 wherein said one transducer trails the other of said transducers; and further including means for advancing said transducers from one set of scan lines to another at a rate which is varied in response to the video signals from said other transducer to provide line skipping for any set of redundant lines and line-by-line processing for any nonredundant line.

14. The facsimile transmitting terminal of claim 13 further including white line detector means coupled to the transducer adjacent said trailing transducer for providing a white line indication whenever the video signal provided by said adjacent transducer remains at a level characteristic of background information throughout a scanning pass, means for advancing said transducers an additional increment equal to said scan pitch in response to said indication, and means for combining said indication with said control signal and said predetermined video signal for transmission to said receiving terminal.

15. The facsimile transmitting terminal of claim 14 wherein the signalling state of said control signal is set by a signal generator under the control of a gate means and a timer means; said gate means being coupled to the other of said transducers for detecting any nontracking of the video signals provided thereby, and said timer means being coupled between said gate means and said signal generator for triggering said signal generator so that said control signal is set to said other signalling state following any scanning pass during which the video signals from said other transducers fail to track for a predetermined period of time.

16. In a facsimile receiving terminal for printing a facsimile of a subject copy in accordance with a scanning pattern having a series of uniformly spaced scan lines offset from one another by a predetermined scan pitch in response to a video signal serially representing information appearing on said subject copy along at least a part of said scan lines and under the control of a control signal having a signalling state identifying the other of said scan lines as being redundant lines; the combination comprising a plurality of print heads aligned transversely of said scan lines and offset from one another by a predetermined integer multiple of said scan pitch to align with different ones of said scan lines;

means for applying said video signal to a predetermined one of said print heads, whereby at least one of said scan lines is printed on each scanning pass of said print heads; and means for selectively enabling and disabling the other of said print heads in response to said control signal, whereby said receiving terminal is switched between a block printing format for simultaneously printing redundant lines on a single pass and a line-by-line printing format for individuallly printing non-redundant lines on separate passes.

17. The facsimile receiving terminal of claim 16 wherein the print heads are offset from one another by a distance equal to said scan pitch, whereby said print heads align with adjacent ones of said scan lines; and further including means for advancing said print heads from one set of scan lines to another under the control of said control signal and at a rate which is varied to provide line skipping for any redundant lines and line-by-line processing for any non-redundant line.

18. The facsimile receiving terminal of claim 16 wherein there additionally is an incomimg white line indication whenever a scan line having its information content represented by said video signal is followed by a scan line containing nothing other than background information; and further including means for advancing said print heads an additional increment equal to the scan pitch in response to any such indication, whereby white lines are also skipped.

19. A limited bandwidth facsimile system comprising a transmitting terminal and a receiving terminal for scanning a subject copy and printing a facsimile copy, respectively, in phase synchronism and in accordance with substantially identical scanning patterns each having a series of uniformly spaced scan lines separated from one another by a predetermined scan pitch;

said transmitting terminal including a plurality of transducers aligned transversely of said scan lines and offset from one another by a distance equal to said scan pitch for simultaneously converting information appearing on said subject copy along adjacent ones of said scan lines into corresponding video signals on each pass of said transducers relative to said subject copy, means coupled to said transducers for generating a control signal having a signalling state which is changed in response to said video signals whenever the information appearing along said adjacent scan lines is non-redundant, and, means for combining said control signal with a predetermined one of said video signals for transmission to said receiving terminal;

said receiving terminal including a plurality of print heads aligned transversely of said scan lines and offset from one another by a distance equal to said scan pitch, whereby each of said print heads positionally corresponds to a respective one of said transducers, means for applying said video signal to a predetermined one of said print heads, and detector means for selectively enabling and disabling the other of said print heads in response to the signalling state of said control signal, whereby any redundant lines are simultaneously printed on a single pass and any non-redundant lines are individually printed on separate passes.

20. The system of claim 19 wherein said one video signal is provided by a transducer which trails the other of said transducers, and said one print head trails the other of said print heads; and transmitting terminal further including means for advancing said transducers from one set of scan lines to the next under the control of said video signals and at a rate which is varied to provide line skipping for redundant lines and line-by-line processing for non-redundant lines; and said receiving terminal further including means for advancing said print heads from one set of scan lines to the next under the control of said control signal and at a rate which is also selected to provide line skipping for redundant lines and line-by-line processing of non-redundant lines.

21. The system of claim 20 wherein said transmitting terminal further includes a signal generator for supplying said control signal, means for resetting said signal generator in preparation for each scanning pass so that the signalling state of siad control signal conditionally indicates that redundant lines are being scanned at the outset of each scanning pass, gate means coupled to said transducers for detecting any non-tracking of the video signals provided thereby, and timer means coupled between said gate means and said signal generator for triggering said signal generator to change the signalling state of said control signal whenever said video signals fail to track for a predetermined period of time while a pass is in progress.

22. The system of claim 20 wherein said transmitting terminal further includes a white line detector coupled to the transducer adjacent said trailing transducer for supplying a white line indication whenever the video signal provided by said adjacent transducer remains at a level characteristic of background information throughout a scanning pass, means for advancing said transducers an additional increment equal to said scan pitch in response to any such indication, and means for combining any such indication with said control signal and said predetermined video signal from transmission to said receiving terminal; and said receiving terminal further includes means for advancing said print heads an additional increment equal to said scan pitch in response to any such indication; whereby white lines are also skipped.

23. A limited bandwidth facsimile system comprising a transmitting terminal and a receiving terminal for scanning a subject copy and printing a facsimile copy, respectively, in phase synchronism and in accordance with substantially identical scanning patterns each having a series of uniformally spaced scan lines separated from one another by a predetermined scan pitch;

said transmitting terminal including a trailing transducer and a plurality of other transducers aligned transversely of said scan lines and offset from one another by a distance equal to said scan pitch for simultaneously converting information appearing on said subject copy along adjacent ones of said scan lines into corresponding video signals on each scanning pass of said transducers relative to said subject copy;

means for generating a control signal in response to the video signals provided by said other transducers, whereby said control signal is set after each scanning pass at a first signalling state if said other transducers encountered redundant lines during said pass and at a second signalling state if said other transducers encountered non-redundant lines, and means for combining said control signal with the video signal provided by said trailing transducer for transmission to said receiving terminal said receiving terminal including a plurality of print heads aligned transversely of said scan lines and offset by a distance equal to said scan pitch, with each of said print heads corresponding to a respective one of said other transducers, means for applying said video signal to the one of said print heads that trails the others, and means for selectively enabling and disabling the other of said print heads in response to the signalling state of said control signal, whereby redundant lines are simultaneously printed on a single pass and non-redundant lines are individually printed on separate passes.

24. The system of claim 23 wherein said transmitting terminal further includes means for advancing said transducers from one set of scan lines to another at a rate which is varied in response to the video signals provided by said other transducers to provide line skipping for redundant lines and line-by-line processing for non-redundant lines; and said receiving terminal further includes means for advancing said print heads from one set of scan lines to another at a rate which is varied in response to the signalling state of said control signal to provide line skipping for redundant lines and line-by-line processing for non-redundant lines.

25. The system of claim 24 wherein said transmitting terminal further includes detector means coupled to the transducer adjacent said trailing transducer for providing a white line indication when the video signal provided by said adjacent transducer remains at a level characteristic of background information throughout a scanning pass, means for advancing said transducers an additional increment equal to said scan pitch in response to any such indication, and means for combining any such indication with said control signal and the video signal provided by the trailing transducer for transmission to said receiving terminal; and said receiving terminal additionally includes means for advancing said print heads an additional increment equal to said scan pitch whenever a white line indication is received; whereby white lines are also skipped.

26. A method for generating a facsimile of a subject copy comprising the steps of comparing video signals representing information appearing on said subject copy along different scan lines serially for successive sets of scan lines; and printing corresponding lines of said facsimile in response to a video signal serially representing the information appearing along a predetermined one of the scan lines of each of said sets, using a block format to simultaneously print all of the lines of any redundant set of lines and a line-by-line format to individually print any non-redundant lines.

* * * * *